(12) United States Patent
Xu et al.

(10) Patent No.: US 10,114,672 B2
(45) Date of Patent: Oct. 30, 2018

(54) USER-CENTERED TASK SCHEDULING FOR MULTI-SCREEN VIEWING IN CLOUD COMPUTING ENVIRONMENT

(71) Applicant: THOMSON LICENSING, Issy de Moulineaux (FR)

(72) Inventors: Yan Xu, Beijing (CN); Lin Du, Beijing (CN); Gang Cheng, Beijing (CN)

(73) Assignee: Thomson Licensing, Issy de Moulineaux (FR)

( * ) Notice: Subject to any disclaimer, the term of this patent is extended or adjusted under 35 U.S.C. 154(b) by 74 days.

(21) Appl. No.: 15/108,833

(22) PCT Filed: Dec. 31, 2013

(86) PCT No.: PCT/CN2013/091095
§ 371 (c)(1),
(2) Date: Jun. 29, 2016

(87) PCT Pub. No.: WO2015/100614
PCT Pub. Date: Jul. 9, 2015

(65) Prior Publication Data
US 2016/0328265 A1  Nov. 10, 2016

(51) Int. Cl.
| G06F 15/16 | (2006.01) |
| G06F 9/48 | (2006.01) |
| H04L 12/28 | (2006.01) |
| H04W 28/00 | (2009.01) |
| H04L 29/08 | (2006.01) |
(Continued)

(52) U.S. Cl.
CPC .......... *G06F 9/4881* (2013.01); *G06F 9/4831* (2013.01); *G06Q 10/109* (2013.01); *H04L 12/28* (2013.01); *H04L 12/2829* (2013.01); *H04L 67/10* (2013.01); *H04L 67/32* (2013.01); *H04W 28/00* (2013.01); *H04L 47/24* (2013.01); *H04N 21/00* (2013.01)

(58) Field of Classification Search
CPC ........ G06F 2203/04804; G06F 3/0481; G09G 2320/0686; G09G 2340/14; G09G 2354/00; G09G 5/14; G07F 17/3211; G07F 17/3244; G07F 17/3239; G07F 17/32; G07F 17/3225; G07F 17/3267; G07F 17/3276; H04L 12/28; H04L 12/2829; H04L 47/24; H04L 67/10; H04L 67/32
USPC .......................................... 709/203, 223–229
See application file for complete search history.

(56) References Cited

U.S. PATENT DOCUMENTS

| 4,890,257 A | * | 12/1989 | Anthias | .................... G09G 5/14 715/807 |
| 5,515,494 A | * | 5/1996 | Lentz | ....................... G09G 5/14 345/545 |

(Continued)

FOREIGN PATENT DOCUMENTS

| CN | 10210811 | 10/2010 |
| CN | 102111819 | 6/2011 |

(Continued)

OTHER PUBLICATIONS

Search Report dated Sep. 30, 2014.

*Primary Examiner* — Zarni Maung
(74) *Attorney, Agent, or Firm* — Vincent E. Duffy

(57) ABSTRACT

A method and apparatus are provided for priority-based task scheduling that is user-centered, with improved user experience in a multi-screen viewing environment.

9 Claims, 3 Drawing Sheets

(51) Int. Cl.
*G06Q 10/10* (2012.01)
*G06F 12/00* (2006.01)
*H04N 21/00* (2011.01)
*H04L 12/851* (2013.01)

(56) References Cited

U.S. PATENT DOCUMENTS

| | | | |
|---|---|---|---|
| 6,622,190 B1* | 9/2003 | Westerman | G06F 3/0481 |
| | | | 710/244 |
| 6,848,015 B2 | 1/2005 | Jones | |
| 7,356,775 B2* | 4/2008 | Ruelle | G06F 3/0481 |
| | | | 715/802 |
| 7,636,487 B2 | 12/2009 | Yoo | |
| 8,200,527 B1 | 12/2012 | Thompson et al. | |
| 9,223,379 B2* | 12/2015 | Gorbatov | G06F 1/3234 |
| 9,674,857 B2* | 6/2017 | Dai | H04W 72/1205 |
| 2003/0074520 A1 | 4/2003 | Weber | |
| 2004/0056900 A1* | 3/2004 | Blume | G06F 3/0481 |
| | | | 715/807 |
| 2007/0214426 A1* | 9/2007 | Ruelle | G06F 3/0481 |
| | | | 715/767 |
| 2009/0167553 A1 | 7/2009 | Hong et al. | |
| 2010/0031366 A1 | 2/2010 | Knight et al. | |
| 2010/0214916 A1 | 8/2010 | Wu et al. | |
| 2011/0022972 A1* | 1/2011 | McCoy | G06F 17/30241 |
| | | | 715/764 |
| 2011/0060623 A1 | 3/2011 | Neureuter | |
| 2011/0102386 A1* | 5/2011 | Sahashi | G06F 3/0481 |
| | | | 345/204 |
| 2011/0157193 A1* | 6/2011 | Boucher | G06F 3/1438 |
| | | | 345/505 |
| 2011/0283306 A1 | 11/2011 | Davis et al. | |
| 2011/0314115 A1 | 12/2011 | Nagaraj | |
| 2012/0086978 A1 | 4/2012 | Uchikawa | |
| 2012/0102498 A1 | 4/2012 | Subramanya et al. | |
| 2012/0173436 A1 | 7/2012 | Smith | |
| 2012/0185848 A1 | 7/2012 | Devarakonda et al. | |
| 2013/0013987 A1 | 1/2013 | Kim | |
| 2013/0091505 A1 | 4/2013 | Yu et al. | |
| 2013/0173742 A1 | 7/2013 | Thomas et al. | |
| 2015/0350313 A1* | 12/2015 | Doyle | G06F 9/5044 |
| | | | 709/226 |

FOREIGN PATENT DOCUMENTS

| | | |
|---|---|---|
| CN | 101887382 | 10/2012 |
| CN | 103136056 | 6/2013 |
| EP | 2611085 | 7/2013 |
| WO | WO2012028957 | 3/2012 |

* cited by examiner

USER-CENTERED TASK SCHEDULING FOR MULTI-SCREEN VIEWING IN CLOUD COMPUTING ENVIRONMENT

This application claims the benefit, under 35 U.S.C. § 365 of International Application PCT/CN2013/091095 filed Dec. 31, 2013 which was published in accordance with PCT article 21(2) on Jul. 9, 2015 in English.

TECHNICAL FIELD

The present invention generally relates to multi-screen viewing, and more particularly, to a priority-based task scheduling method that takes into account the characteristics of the multi-screen viewing environment.

BACKGROUND

Multi-screen viewing has become increasingly popular, with each user often having multiple screens such as television (TV), personal computer (PC), laptop, tablet, mobile, and so on. The device chosen by a user is often driven by context, such as where the user is, what the user wants to accomplish and the amount of time needed. For example, computers keep users productive and informed, mobiles keep users connected, tablets keep users entertained, and portable screens allow user to move easily from one device to another. When multiple devices are used simultaneously, a user's attention is split between distinct activities on each device.

Task scheduling is an important aspect of providing good user experience for multi-screen viewing in a cloud computing environment. Although there are various task scheduling schemes for cloud computing, few are specifically designed for multi-screen viewing. Multi-screen task scheduling is particularly challenging because of its special application environment.

Accordingly, there is a need for improved task scheduling schemes for multi-screen viewing in a cloud computing environment.

SUMMARY OF THE INVENTION

One aspect of the present invention provides a method that comprises receiving, via a device, a plurality of requests from users, wherein each user has a plurality of associated viewing screens; determining, via the device, a priority score for each one of the requests based on at least one factor related to the plurality of associated viewing screens; and processing one of the requests based on the priority score.

Another aspect of the present invention provides a device, such as a server, which comprises a module for receiving a plurality of requests from users, wherein each user has a plurality of associated viewing screens; and a module for determining a priority score for each one of the requests based on at least one factor related to the plurality of associated viewing screens.

Yet another aspect of the present invention provides an electronic apparatus, such as one or more servers. The electronic apparatus comprises computer hardware operative to execute computer software, which when executed, enables: (i) receipt of a plurality of requests from users, wherein each user has a plurality of associated viewing screens, and further enables (ii) generation of a priority score for each one of the requests based on at least one factor related to the plurality of associated viewing screens.

This summary of exemplary embodiments of the present invention is merely illustrative of the inventive concepts presented herein, and is not intended to limit the scope of the present invention in any manner.

BRIEF DESCRIPTION OF THE DRAWINGS

The teachings of the present principles can be readily understood by considering the following detailed description in conjunction with the accompanying drawings, in which.

Figure 1:
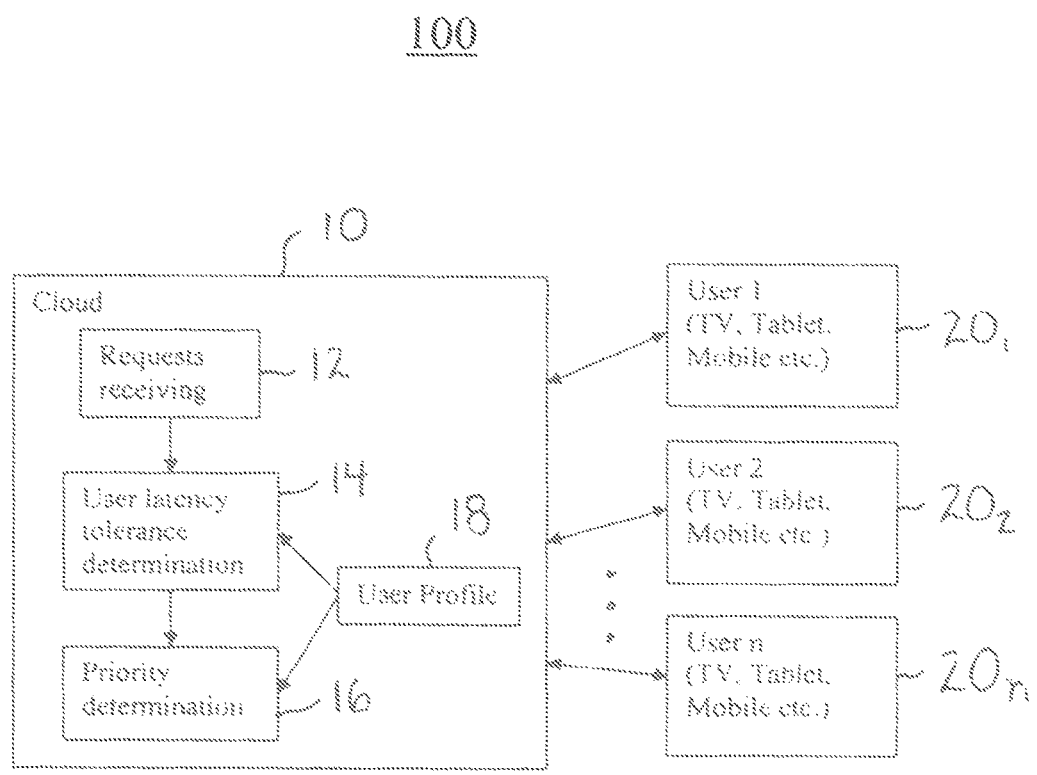
FIG. 1 shows a block diagram of a multi-screen viewing system in a cloud computing environment according to exemplary embodiments of the present invention.

The examples illustrate preferred embodiments according to the present invention, and such examples are not to be construed as limiting the scope of the invention in any manner.

DETAILED DESCRIPTION

This invention provides a method of task scheduling for multi-screen viewing in a cloud computing environment. The task scheduling is multi-screen user oriented, and takes into account some factors that are specific to multi-screen viewing, which affect users' quality of experience. These factors include users' split attention among devices, users' preference for certain devices and content, users' latency tolerance on different devices and content, and so on. The objectives of the associated scheduling algorithm include improving user experience and keeping fair and efficient access to cloud computing resources among users.

For multi-screen viewing, each user often has multiple screens, such as TV, PC or laptop, tablet, mobile, and so on. The multiple screens also mean multiple user devices, and the term "screen" and "user device" may be used interchangeably. The multiple screens belonging to one user are called the user's associated screens. Each user uses these screens at different frequencies, and the screen that is used most frequently is called the dominant screen. Each user also has different latency tolerance on different types of content, and different latency tolerance on different devices. User latency tolerance is the elapsed time (or time duration) between sending a request and receiving a response, which a user can tolerate. A user will typically give up waiting for a response if the response is not received within the user's latency tolerance. In the context of this invention, "user latency tolerance" is a time duration based on various factors such as types of content or device, among others. For example, a user's latency tolerance can be 500 ms for text, and 2 s for video. The latency tolerance is complicated in the multi-screen environment, and in some cases, is also an important factor in determining the scheduling priority.

The associated screen status, the dominant screen and the latency tolerance are three factors being considered in task scheduling according to the present principles. This invention gives a scheduling framework which includes two modules, latency tolerance determination and scheduling priority determination.

It is to be understood that the present invention may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

Furthermore, since some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

FIG. 1 shows a block diagram of a multi-screen viewing system 100 with an exemplary architecture for task scheduling in a cloud computing environment according to embodiments of the present invention. System 100 includes cloud environment 10 and a plurality of users $20_1$ to $20_n$. Cloud environment 10 comprises several hardware and software modules, including requests receiving module 12, latency tolerance determination module 14, scheduling priority determination module 16 and user profile module 18. Cloud environment 10 may also include one or more general purpose computing elements, such as one or more processors and/or controllers (not shown), and may be generally embodied using one or more devices such as servers and/or other electronic apparatus, among others.

Advantageously, scheduling algorithms used by scheduling priority determination module 16 of FIG. 1 provide efficient access to computing resources of cloud 10 among users while taking into account factors specific to multi-screen viewing applications. For multi-screen viewing, each user $20_1$ to $20_n$ often has multiple screens, such as TV, PC, tablet, mobile device, etc.

During operation of system 100 in FIG. 1, users $20_1$ to $20_n$ make requests to cloud 10 via module 12, and cloud 10 receives and processes the requests. According to exemplary embodiments, each user $20_1$ to $20_n$ logs onto cloud environment 10 using his or her user name and password. A user profile is a collection of personal data associated with a specific user. User profile module 18 is operative to track, store and provide different types of data, including, for example, demographic and psychographic data such as age, gender, device list, interest graph metrics, and viewing patterns of behaviour for every user $20_1$ to $20_n$ within system 100. According to exemplary embodiments, user profile module 18 tracks, stores and provides data that enables, among other things, latency tolerance determination module 14 to determine user latency tolerance, and scheduling priority determination module 16 to determine priority among requests, as described below.

Task scheduling according to principles of the present invention exploits the characteristics of multi-screen viewing, such as associated screens and dominant screen. The dominant screen of one user may be changed according to one or more factors, such as time of day, user location, among others.

Figure 2:
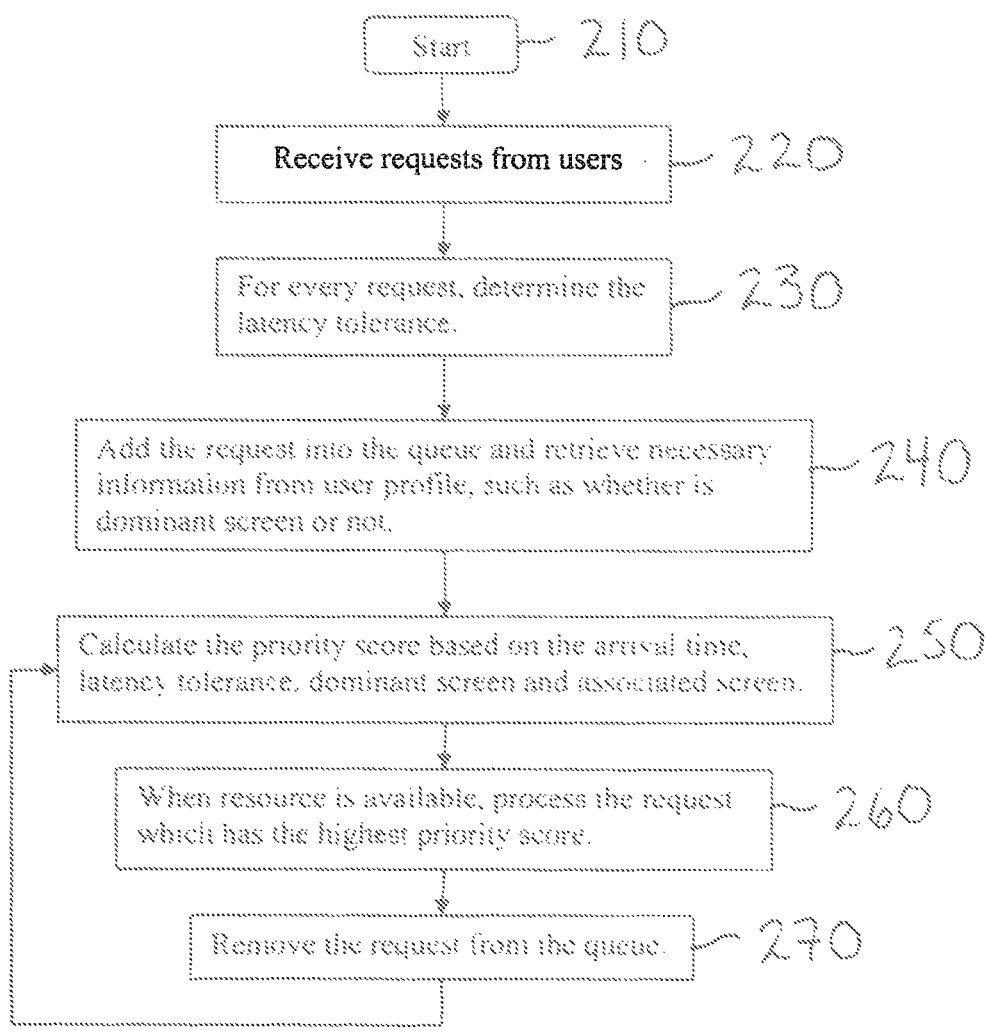
FIG. 2 shows a flowchart representing a general framework of task scheduling for a multi-screen viewing system in a cloud computing environment according to exemplary embodiments of the present invention.

FIG. 2 shows a flowchart 200 representing the general framework of task scheduling for a multi-screen viewing system in a cloud computing environment according to exemplary embodiments of the present invention. For purposes of example and explanation only, the steps of flowchart 200 may be described with specific reference to elements of FIG. 1, and are not intended to limit the scope of the present invention.

Flowchart 200 starts at step 210 and proceeds to step 220 where requests (e.g., for specific content, etc.) from users $20_1$ to $20_n$ are received at the cloud environment 10. If computing resources of cloud environment 10 are available, the request is processed immediately. However, if computing resources of cloud environment 10 are not available, the request is sent to a queue.

At step 230, for every request from a user $20_1$ to $20_n$, the user latency tolerance is determined based on, for example, the requested content, the user's device, and so on. At step 240, the request is added to the queue and necessary information is retrieved from the applicable user profile, including whether the device sending the request is a dominant device or not.

At step 250, a priority score is calculated for each request based on factors including arrival time, latency tolerance, dominant screen and associated screen status. At step 260, when computing resources of cloud 10 are available, the specific user request with the highest priority score is processed. Thereafter, at step 270, the processed request is removed from the queue and process flow loops back to step 250 where the priority score is recalculated for each of the pending requests. In this manner, requests are sequentially processed in an order according to their priority scores.

According to exemplary embodiments, the user latency tolerance is determined at step 230 by latency tolerance determination module 14 according to one or more factors, such as the type of content requested, the type of requesting device, the request time of day, and/or the user identity (i.e., based on at least one of these factors, and combinations thereof). Users may have different latency tolerances to different types of content, the same user may have different latency tolerances when the request is initiated from different devices, and different users may have different latency tolerances to the same type of content.

The latency tolerance data can be configured by users and/or be determined and modified through collecting and analyzing users' behaviour data. The user latency tolerance data can be represented as a function of content, device, time of day, and/or other parameters in any suitable combination. Data related to user latency tolerance is stored and updated in user profile module 18 of FIG. 1.

In some cases, the latency tolerance determined at step 230 can be an important factor (e.g., potentially dispositive in some embodiments) for determining the scheduling priority at step 250. In other embodiments, the requesting time (i.e., time at which a request is sent) plus the applicable latency tolerance, the combination of which may be referred to as a "deadline", can be used as another factor for priority determination.

The priority (i.e., which user request will be served first or next by the computing resources of cloud 10), which can be represented by a priority score, is determined based on consideration of at least one factor, including the "deadline", the dominant screen, the associated screens' status, and/or any combination thereof. In some embodiments, after the latency tolerance is determined, the requests are sorted (e.g., in an increasing order) based on the deadline, i.e., request time plus latency tolerance.

According to exemplary embodiments, the general rules for determining the scheduling priority at step 250 of FIG. 2 are as follows:
1. The priority will be given to the request which has the earliest deadline.
2. The priority will be given to the request from the dominant screen.
3. The priority will be given to the request whose associated screens are not active (e.g., not currently turned on or otherwise operating).

These rules may be considered individually, or in any suitable combination with each other and/or other rules. In this manner, the priority calculated at step 250 of FIG. 2 may be represented for example as a function of the deadline, dominant screen, associated screens status and/or other rules in any suitable combination.

Figure 3:
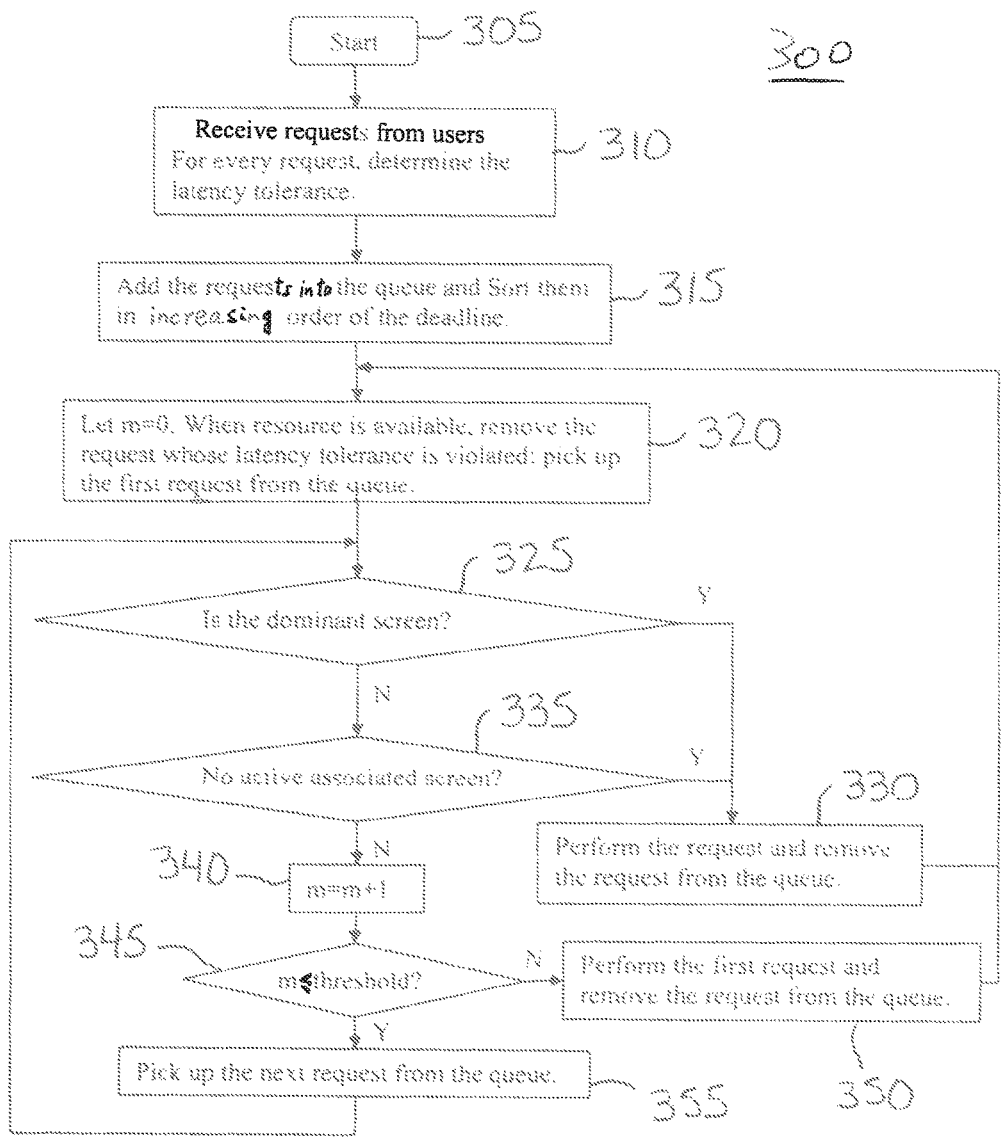
FIG. 3 shows a flowchart representing an example of task scheduling for a multi-screen viewing system in a cloud computing environment according to exemplary embodiments of the present invention.

FIG. 3 shows a flowchart 300 representing an example of task scheduling for a multi-screen viewing system in a cloud computing environment according to exemplary embodiments of the present invention. For purposes of example and explanation only, the steps of flowchart 300 may be described with specific reference to elements or steps of FIGS. 1 and 2, and are not intended to limit the scope of the present invention.

Flowchart 300 of FIG. 3 starts at step 305 and proceeds to step 310 where module 12 of cloud environment 10 receives requests (e.g., for specific content, etc.) from users $20_1$ to $20_n$. Also at step 310, the user latency tolerance (as previously described) is determined, for example, by user latency tolerance determination module 14 according to one or more factors, such as the type of content requested, the type of requesting device, the request time of day and/or other factors.

At step 315, each received request is placed in a queue in cloud environment 10 and the received requests are sorted in a predetermined manner, e.g., in an increasing order based on the deadline discussed above.

When computing resources of cloud environment 10 are available, process flow advances from step 315 to step 320, where one or more functions or tasks may be performed. These tasks include, for example, initializing an index "m" (e.g., set to zero); determining a threshold value that represents a number of requests to be selected as candidates for possible immediate processing (can be less than or equal to the total number of requests in the queue); picking up or retrieving the first request from the queue (i.e., the request having the shortest deadline); and removing the request from the queue if its latency tolerance has been violated.

Different criteria or rules can be used to determine whether latency tolerance for a request has been violated or exceeded. In one example, latency tolerance is considered violated if the current time is greater than the deadline minus one way transmission delay minus processing delay. The one way transmission delay is given by the arrival time of the request at the server minus requesting time (i.e., time at which request is sent by user). The processing delay can be estimated based on the available CPU of the cloud environment and the request task.

At step 320, if the latency tolerance of the first request has not been violated, then the request will be performed, in which case, process flow advances to the algorithm or method steps represented in steps 325 to 355, where computing resources of cloud environment 10 perform various steps to sequentially and iteratively process active user requests in the queue of cloud environment 10. Specifically, steps 325 to 355 are performed to determine the priority of the request, e.g., based on the dominant screen or active associated screen status, and when to perform the request. If the request has a higher priority than the deadline (e.g., dominant screen or has no active associated screen), it will be processed immediately upon being picked up from the queue. Otherwise the next request in the queue will be picked up to perform steps 325 to 355 again. If the number of the request being picked up exceeds the threshold, then the first request (if it has not yet been performed) in the queue has the first priority, so the first request in the queue will be processed. This exemplary algorithm is discussed below.

At step 325, a determination is made as to whether a current request (e.g., for particular content, etc.) from the queue is sent from a dominant screen (i.e., the screen which is used most often by the user). If the determination at step 325 is positive or "yes", process flow advances to step 330 where the request is performed and removed from the queue. From step 330, process flow loops back to step 320.

Alternatively, if the determination at step 325 is negative or "no" (i.e., request is not sent from a dominant screen), process flow advances to step 335 where a determination is made as to whether the request or requesting user has no active associated screens (e.g., none of the applicable user devices associated with the request are turned on or operating, etc.). If the determination at step 335 is positive, process flow advances to step 330 where the request is performed and removed from the queue, and process flow loops back to step 320.

If the determination at step 335 is negative (i.e., there is at least one active associated screen for the user of the current request), process flow advances to step 340 where the index "m" is incremented by one (i.e., m=m+1). Process flow then advances to step 345 where a determination is made as to whether the current value of the index "m" is less than or equal to the predetermined threshold value (e.g., determined from step 320).

If the determination at step 345 is negative, process flow advances to step 350 where the first request is performed and removed from the queue, and process flow loops back to step 320.

However, if the determination at step 345 is positive, process flow advances to step 355, where computing resources of cloud environment 10 retrieve and process the next request from the queue, and process flow loops back to step 325, and subsequent steps may be repeated as previously described.

According to the example depicted in FIG. 3, the priority determination is explained as follows. For those requests whose deadlines are less than or equal to a predetermined deadline threshold, priority will be given to the request by considering the following factors in sequence (i.e., decreasing priority): 1) from the dominant screen; 2) no active associated screens; 3) shortest deadline.

Table 1 below shows the priority results for each of the aforementioned factors in combination (with √ indicating "yes", and - indicating "no"). The request that is from the dominant screen, with no active associated screens and has the shortest deadline will be given the highest priority. The request that is not from the dominant screen, with some (i.e., at least one) active associated screens and does not have the shortest deadline, will be given the lowest priority. In general, however, if there are several requests that are not from dominant screen and they also do not have any active associated screens, then the request with the longest deadline will be given the lowest priority.

TABLE 1

| Priority | From the dominant screen | No active associated screens | Shortest deadline |
|---|---|---|---|
| 1 | ✓ | ✓ | ✓ |
| 2 | ✓ | ✓ | — |
| 3 | ✓ | — | ✓ |
| 4 | ✓ | — | — |
| 5 | — | ✓ | ✓ |
| 6 | — | ✓ | — |
| 7 | — | — | ✓ |
| 8 | — | — | — |

The threshold used in FIG. 3 can be represented in various ways. For example, the threshold can be set to a predetermined number (e.g., 2, 3, 4, etc.), which means an exact number of requests in the queue will be picked up or retrieved as candidates for immediate processing, i.e., processed with the first priority. In one example, the priority scores are calculated for the selected candidates, and only the request that has the first priority will be immediately processed.

The threshold can also be determined based on all of the deadlines of the requests in the queue. For example, the threshold may be set to be no more than 1.1 times the minimum deadline in the queue, or the threshold may be set to be no more than the median deadline in the queue. Other ways of setting the threshold may also be used. Although the threshold can be represented in different manners, these various threshold representations can still be mapped to a value that refers to an exact number of requests in the queue.

As described above, the present invention provides a priority-based task scheduling method that takes into account the characteristics of a multi-screen viewing environment, which is user-centered and provides users with good quality of experience.

While the forgoing is directed to various embodiments according to the present principles, other embodiments may be devised without departing from the basic scope thereof. Thus, the appropriate scope of the invention is to be determined according to the claims that follow.

What is claimed is:

1. A method performed by one or more processors, comprising:
   receiving a plurality of requests from users, wherein each user has a plurality of associated viewing screens;
   determining a priority score for each one of said requests based on at least one factor related to said plurality of associated viewing screens; and
   processing one of said requests based on said priority score, wherein:
      the at least one factor related to said plurality of associated viewing screens includes at least one of whether said request is from a user device associated with a dominant screen that is most frequently used by said user, and whether none of said plurality of associated viewing screens for said user is active;
      the priority score is further based on a deadline associated with said request;
      the deadline is based on an arrival time of said request and a user latency tolerance associated with said request; and
      the user latency tolerance is based on an applicable user device.

2. The method of claim 1, wherein each of said plurality of associated viewing screens corresponds to a separate user device selected from a group including a television, a computer and a mobile device.

3. The method of claim 1, wherein said device comprises a server in a cloud computing environment.

4. A device, comprising one or more processors configured to:
   receive a plurality of requests from users, wherein each said user has a plurality of associated viewing screens;
   determine a priority score for each one of said requests based on at least one factor related to said plurality of associated viewing screens; and
   process one of said requests based on said priority score, wherein:
      the at least one factor related to said plurality of associated viewing screens includes at least one of whether said request is from a user device associated with a dominant screen that is most frequently used by said user, and whether none of said plurality of associated viewing screens for said user is active;
      the priority score is further based on a deadline associated with said request;
      the deadline is based on an arrival time of said request and a user latency tolerance associated with said request; and
      the user latency tolerance is based on an applicable user device.

5. The device of claim 4, wherein each of said plurality of associated viewing screens corresponds to a separate user device selected from a group including a television, a computer and a mobile device.

6. The device of claim 4, wherein one of said requests is processed based on said priority score and said device comprises a server in a cloud computing environment.

7. Electronic apparatus, comprising:
   computer hardware operative to execute computer software, which when executed, enables receipt of a plurality of requests from users, wherein each said user has a plurality of associated viewing screens, and further enables generation of a priority score for each one of said requests based on at least one factor related to said plurality of associated viewing screens, and further enables processing one of said requests based on said priority score, wherein:
      the at least one factor related to said plurality of associated viewing screens includes at least one of whether said request is from a user device associated with a dominant screen that is most frequently used by said user, and whether none of said plurality of associated viewing screens for said user is active;
      the priority score is further based on a deadline associated with said request;
      the deadline is based on an arrival time of said request and a user latency tolerance associated with said request; and
      the user latency tolerance is based on an applicable user device.

8. The electronic apparatus of claim 7, wherein each of said plurality of associated viewing screens corresponds to a separate user device selected from a group including a television, a computer and a mobile device.

9. The electronic apparatus of claim 7, wherein one of said requests is processed based on said priority score and said device comprises a server in a cloud computing environment.

* * * * *